Sept. 10, 1968  J. L. WOODWORTH  3,401,304
POTENTIAL DEVICE PROTECTIVE NETWORK
Filed Dec. 1, 1965
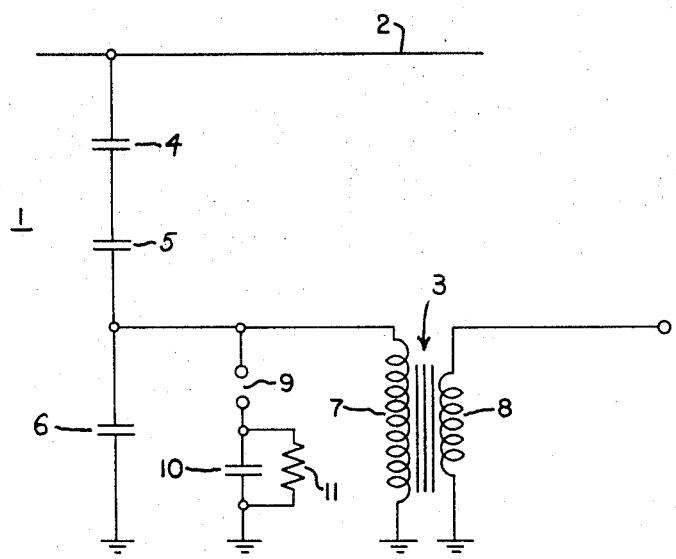
INVENTOR:
JOHN L. WOODWORTH,
BY I. David Blumenfeld
HIS ATTORNEY.

3,401,304
POTENTIAL DEVICE PROTECTIVE NETWORK
John L. Woodworth, Lynchburg, Va., assignor to General
Electric Company, a corporation of New York
Filed Dec. 1, 1965, Ser. No. 510,860
5 Claims. (Cl. 317—12)

ABSTRACT OF THE DISCLOSURE

A protective network for a high-voltage, capacitive potential device which includes a protective gap connected across one of the capacitors of the voltage divider. A storage capacitor is connected in series with the protective gap so that arc-over of the gap during over-voltage conditions transfers sufficient charge to the storage capacitor to reduce the voltage across the capacitor in the divider to a safe level and to extinguish the arc. The capacitor being protected thus is not discharged completely, thereby maintaining an output voltage from the potential device even though the protective gap has operated. Simultaneously, provision is made to discharge the storage capacitor rapidly to prevent inadvertent restriking of the arc due to the trapped charge in storage capacitor which may raise the potential across the gap sufficiently to cause it to restrike even though the over-voltage condition may have terminated.

---

This invention relates to a protective network for a high-voltage capacitive-potential device, and more particularly to one which provides over-voltage protection, as well as suppression or rapid dampening of ferro-resonant effects.

High-voltage potential devices of the type often utilized with high-voltage power transmission lines, to provide a suitable low-level voltage for measuring or protective relaying operations, usually include a capacitive voltage-dividing network coupled between the high-voltage line and ground. The primary winding of a step-down transformer is coupled across one of the capacitors of the divider to produce a low-level voltage across the secondary of the transformer for measuring or protective relaying purposes. In order to prevent overvoltages due to ferro-resonance, which may, for example, be due to transient disturbances such as may occur during line switching, or during lightning disturbances, etc., it has been customary in the past to provide a discharge gap connected in parallel with one of the capacitors of the voltage divider, with the discharge gap being set to arc over and discharge the capacitor whenever the voltage on the capacitor exceeds a predetermined value, for example, at twice the normal capacitor operating voltage. Whether the voltage across the divider capacitor exceeds the predetermined level, the gap arcs over, discharging the capacitor.

Although the over-voltage protective arrangement just described is effective in preventing the previously mentioned ferro-resonance, an arrangement of this type suffers from several substantial shortcomings which limit its utility. When the gap arcs over, it discharges the capacitor in an interval of a few microseconds, so that the charge and the voltage across the capacitor, and hence the voltage across the primary of the transformer, drops substantially to zero. Consequently, the output voltage from the potential device also drops to zero. If protective relays are being operated from the output of the potential device, these protective relays are supposed to respond to a fault in the line and the loss of voltage occasioned thereby. Hence, they may operate, not in response to such a fault and loss of voltage, but by virtue of the fact that the over-voltage protective system has simulated the same conditions. Thus, the over-voltage protective system, while effective to prevent ferro-resonance and the difficulties associated with this phenomenon, introduces other problems in the transmission system by erroneously and inadvertently operating the fault or protective relay. Alternatively, one must insert time delay in relays to ensure that they are operating in response to a fault, rather than a simulated condition due to over-voltage. This, of course, is undesirable, since it slows down operation of the protective relays.

These prior-art over-voltage protective networks produce such severe disturbances that transient oscillations are also often produced in the capacitor and transformer combination. Ferro-resonance also produces transient oscillations in the circuit and major disturbances for substantial periods of time which produce harmful effects both on the components of the potential device, as well as deleteriously affecting any instrumentation or protective relays associated with the potential device. That is, in a high-voltage potential device of the type being described, the voltage across a capacitor may very well be in the order of 5,000 or 6,000 volts. Whenever the over-voltage condition is such that the protective gap arcs over, the capacitor is completely discharged. The subsequent charging of the capacitor to operating voltage, and the magnitude of the charging current flowing during this interval is a random function of the phase relationship between the line voltage and the exact instant in time that the arc across the protective gap is extinguished. That is, for example, assuming that the gap has operated to discharge the capacitor, and the arc is extinguished, either by reducing the capacitor voltage to zero or close to zero, the capacitor will start to charge toward a level established by the voltage at the transmission line. If, at the exact instant that the gap is extinguished, the line voltage is passing through zero, the charging current flow into the discharged capacitor increases smoothly from zero to a peak value, the circuit remains perfectly stable and the capacitor charges up to voltage. If, however, at the instant that the arc is extinguished, the line voltage is at a peak or crest value, the instantaneous charging current for that capacitor (which under normal circumstances is at a voltage of several thousand volts) is extremely high and may be on the order of several thousands amperes. Such a large charging current may set up severe disturbances, since the inductive devices, i.e., the primary and secondary winding and the magnetic core of the transformer, associated with the capacitor are non-linear. These disturbances are oscillatory in nature. The oscillatory conditions can produce extremely high current and voltage variations, which may persist for an interval which may exceed by several orders of magnitude the actual duration of the initial switching or other disturbance on the line.

A need, therefore, exists for a protective network which eliminates or minimizes ferro-resonant effects and transient oscillations, as well as preventing complete discharge of the capacitor by the protective gap, thereby maintaining a relatively steady high RMS value at the output of the transformer of the potential device, even though the protective gaps are operated to provide over-voltage protection.

It is, therefore, a primary objective of this invention to provide a protective network for a potential device which minimizes ferro-resonant effects in the device.

Yet another objective of the invention is to provide an over-voltage protective network which maintains a relatively high steady state output voltage even when the protective network is operating during over-voltage conditions.

Still another objective of the invention is to provide a protective network for a potential device which provides the desired over-voltage protective features while yet preventing inadvertent and erroneous operation of the protective relays operating from the potential device.

Yet another objective of the invention is to provide a protective network which is characterized by the fact that the trapped charge is neutralized and discharged to prevent erratic operation of the protective gaps.

Other objectives and advantages of the invention will become apparent as the description thereof proceeds.

The various advantages of the invention are realized in one form thereof by providing a protective network connected in parallel with one of the capacitors of the capacitive voltage divider, which network includes a protective gap connected in series with a capacitor which is substantially of the same size as the capacitor being protected. When arc-over occurs, approximately one-half of the charge from the protected capacitor is transferred to the capacitor in series with the gap, thereby rapidly reducing the voltage across the voltage divider capacitor by approximately 50% and extinguishing the arc. If the over-voltage is of short duration and of relatively small magnitude, the arc is extinguished, and the voltage across the divider capacitor is reduced to its normal value, usually within one operation; for larger disturbances of short duration, several restrikes of the gap may be required. However, the capacitor is not discharged to zero or ground potential, but only to half the over-voltage as determined by the arc-over point of the gap. Thus, even though the gap may operate for several cycles during the prolonged over-voltages, the gap operates near the crest of a number of successive cycles, and maintains an output of relatively steady high RMS value at the secondary winding of the transformer to ensure successful operation of the protective relays. Furthermore, the charging current for the capacitor after the arc is extinguished is also limited, thus minimizing the probabilities of ferro-resonant effects.

In order to minimize the effect of any trapped charge in the capacitor connected in series with the gap, and thereby to prevent erratic operation of the protective gap, a discharge path is provided for the series capacitor to provide a rapid discharge of the capacitor upon extinction of the arc. The time constant of the capacitor and its associated resistive discharge path is a small fraction of the period of the 60-cycle line voltage, thereby enhancing operation of the entire device.

The various features of the invention, which are believed to be new and novel, are set forth with particularity in the appended claims. The invention, itself, however, may best be understood by reference to the following description, when taken in conjunction with the accompanying drawings, in which:

The sole figure is a diagrammatic illustration of the protective network and the potential device associated therewith.

The figure illustrates, in diagrammatic form, a potential device and the associated protective circuit which forms the subject of the instant invention. The potential device includes a capacitive voltage divider 1, coupled to a high-voltage line 2, and a step-down transformer 3. High-voltage transmission line 2 may, for example, be a 50,000 to 500,000-volt line and must be stepped down to usable levels by means of voltage divider 1, which consists of capacitors 4, 5, and 6, connected in series between the line and ground. Primary winding 7 of the step-down transformer is coupled across capacitor 6 of the voltage divider and produces a usable voltage which may, for example, be 115 or 66.4 volts, across transformer secondary winding. Capacitors 4, 5, and 6, are, of course, only representative in that the voltage divider may have many additional capacitive units. It is understood that the relative numbers and values of the capacitors are such as to produce across capacitor 6 the desired fraction of the line voltage at the transmission line 2. Thus, in many instances, the typical voltage across the capacitor 5 of the potential device will be in the order of 5,000–6,000 volts with transformer 3 stepping this voltage down to the desired value at the output of its secondary winding 8.

A protective network is connected in shunt with capacitor 6 and the primary winding of transformer 3, and is characterized by the fact that it only partially discharges capacitor 6 during over-voltage conditions for protective purposes, while avoiding erroneous action of the protective relays coupled to secondary winding 8 of the transformer, and also preventing excessive charging currents which are apt to initiate ferro-resonant oscillating conditions. The protective network consists of a discharge gap 9, connected in series with a capacitor 10, which is approximately of the same magnitude as the protected capacitor 6. Protective gap 9 can be of any suitable configuration well known in the art, and is of a size and has a spacing such that it breaks down and arcs over only if the voltage across capacitor 6 exceeds a predetermined level. It is not unusual, for example, to set the protective gap at a value such that the gap breaks down and arcs over only if the voltage across the capacitor exceeds twice the value of the normal operating voltage. Whenever the gap arcs over, charge flows from capacitor 6 to capacitor 10, thereby lowering the voltage across capacitor 5. Since the capacitors are approximately equal in size, approximately one half of the charge from capacitor 6 is transferred to capacitor 10 in a discharge of a few microseconds' duration. This momentarily reduces the value of the voltage across the capacitor 6 to one half of its value, thereby extinguishing the arc. Since the arc-over point of gap 9 is set at twice the normal operating voltage, it can be seen that the discharge of capacitor 6 reduces its voltage toward the level of the normal operating voltage, thereby producing extinction of the arc across gap 9 before the capacitor 5 is permitted to discharge completely, which, in fact, stabilizes the voltage at the normal operating level.

In order to prevent erratic operation of the discharge gap because of the presence of capacitor 10, a resistive discharge path 11 is provided in shunt with the capacitor to permit rapid discharge of the charge stored in capacitor 10 whenever the arc across gap 9 is extinguished. In the absence of such a discharge path, the trapped charge on the capacitor acts as a bias voltage which may produce inadvertent refiring of the gap 9 during opposite line voltage alternations. That is, assume for the moment that during the positive alternation of the line voltage, a line disturbance occurs so that the voltage across capacitor 6 rose from its normal operating level of 5,000 volts to a peak of 11,000 volts, which exceeds the arc-over voltage of gap 9, which is set at twice the normal operating voltage, or 10,000 volts. Gap 9 arcs over and, in a discharge of a few microseconds, transfers approximately one half of the charge from capacitor 6 to capacitor 10, tending to reduce the voltage on capacitor 6 to 5500 volts, and raising the voltage on capaictor 10 also to 5500 volts, the exact voltage level being determined by the extinction voltage of gap 9, which will usually be lower than its firing voltage. Since it was stated that the arc-over took place during the positive alternation, it is obvious that the voltage across capacitor 10 is such that the upper plate is positive with respect to the lower or grounded plate, i.e., there is +5500 volts across the capacitor. During the negative alternation of the line voltage, the voltage across capacitor 6 is now negative, so that the upper plate and the upper electrode of gap 9 now begin going negative with respect to ground. In the absence of a discharge path, substantially all of the charge in capacitor 10 remains trapped, or leaks off very slowly so that the upper plate of the capacitor and the lower electrode of the gap is still at +5500 volts. When the voltage across the capacitor 6 reaches minus 4500 volts, the voltage differential across the electrodes of gap 9 now is equal to 10,000 volts and the gap arcs over, firing the gap, even though the voltage across the capacitor to be protected is only 4500 volts, which is below the normal peak operating voltage and substantially below the desired arc-over point of the protective gap. Thus, in the absence of a discharge path for capacitor 10, the trapped charge on this capacitor may produce erratic operation of the gap and cause it to restrike repeatedly, not necessarily because the over-voltage condition on the line persists, but because of the effect that the trapped charge produces, i.e., a bias voltage which causes the gap to reignite whenever the line voltage alternations change polarity.

In the protective network shown in FIGURE 1, the time constant of the combination of capacitor 10 and resistor 11, in one embodiment of the invention, was made to be approximately one millisecond, which is small compared to the period of one alternation of a 60-cycle wave. That is, one half cycle of a 60-cycle wave has a period of $\frac{1}{120}$ of a second, or approximately 16 milliseconds, whereas the discharge time of the RC combination 10 and 11 is only one millisecond. Hence, the charge on capacitor 10 is rapidly dissipated and the trapped charge does not establish a biasing voltage which reignites gap 9. In one arrangement constructed in accordance with the invention, capacitors 6 and 10 had a capacitanoce of .078 microfarad and resistor 11 had a resistance of 14,000 ohms. The time constant of the RC combination of capacitor 10 and resistor 11 is, therefore, approximately 1 millisecond, or $\frac{1}{8}$ of the duration of one half cycle of the 60-cycle line voltage.

It will be appreciated from the foregoing that a simple, effective over-voltage protective device has been provided, which effectively protects the transformer and the capacitive voltage divider from damage and destruction due to over-voltage produced by ferro-resonance, while at the same time insuring proper operation of the various devices coupled to the output of the potential device and eliminating erratic operation of the system due to transient oscillators or trapped charges.

It will be appreciated that the arrangement shown is a greatly simplified one in that series reactors are usually incorporated in the primary of the transformer in order to maintain the proper phase of the output voltage. These, of course, are also non-linear and add to the problem. However, in order to simplify the explanation of the invention, they have not been illustrated in the drawings.

While a particular embodiment of the invention has been described and shown, it will be understood that it is not limited thereto, since many modifications and variations in the method and the circuit arrangement for carrying out the invention may be made. It is contemplated that the appended claims cover any such modifications as fall within the true spirit and scope of the invention.

What is claimed and desired to be secured by Letters Patent of the United States is:

1. In a high-voltage, capacitive potential device, the combination comprising
   (a) a capacitive voltage divider connected between a high voltage alternating current line and ground,
   (b) a voltage-transforming device having a primary connected across one of the capacitors of said divider,
   (c) a protective network for said capacitor for providing over-voltage protection including,
   (1) a spark gap connected across said capacitor,
   (2) a normally uncharged storage capacitor connected in series with said gap, said storage capacitor being normally uncharged and being charged when said gap arcs over during an over-voltage condition to discharge said capacitor partially before said arc is extinguished and maintaining a relatively high steady-state output even during operation of the protective network,
   (3) a discharge path for rapidly discharging said storage capacitor after the arc is extinguished to avoid inadvertently reigniting the gap due to trapped charge in said storage capacitor.

2. The potential device according to claim 1 wherein said discharge path consists of a resistor connected in parallel with said storage capacitor.

3. The potential device according to claim 2 in which the time constant of the parallel R-C combination is small compared to the period of one alternation of the alternating line voltage applied to the voltage divider.

4. The potential device according to claim 1 wherein said storage capacitor is approximately equal in magnitude to the said capacitor whereby operation of said gap reduces the voltage substantially in half and reduces the voltage across the gap to zero to extinguish the arc while the voltage across said capacitor is at a substantial level.

5. The potential device according to claim 4 wherein the gap configuration is such that the gap arcs over at approximately twice the normal operating voltage of said capacitor whereby the gap is extinguished during operation of the protective network while the voltage across said capacitor is approximately at the desired normal operating voltage.

References Cited

UNITED STATES PATENTS

| 2,005,147 | 6/1935 | Langguth et al. | 317—70 |
| 2,094,361 | 9/1937 | Lee | 317—11 |
| 2,933,652 | 4/1960 | Cuttino | 317—12 |

LEE T. HIX, *Primary Examiner.*

J. D. TRAMMELL, *Assistant Examiner.*